US012498116B2

(12) United States Patent
Pancolini (10) Patent No.: US 12,498,116 B2
(45) Date of Patent: Dec. 16, 2025

(54) BURNER WITH GAS TURBINE FOR PRODUCING A FLAME FOR A HEAT GENERATION SYSTEM

(71) Applicant: C.I.B. UNIGAS S.p.A., Campodarsego (IT)

(72) Inventor: Riccardo Pancolini, Campodarsego (IT)

(73) Assignee: C.I.B. UNIGAS S.p.A., Campodarsego (IT)

( * ) Notice: Subject to any disclaimer, the term of this patent is extended or adjusted under 35 U.S.C. 154(b) by 380 days.

(21) Appl. No.: 18/002,084

(22) PCT Filed: Jun. 7, 2021

(86) PCT No.: PCT/IB2021/054954
§ 371 (c)(1),
(2) Date: Dec. 16, 2022

(87) PCT Pub. No.: WO2021/255573
PCT Pub. Date: Dec. 23, 2021

(65) Prior Publication Data
US 2023/0228417 A1 Jul. 20, 2023

(30) Foreign Application Priority Data
Jun. 17, 2020 (IT) .................. 102020000014506

(51) Int. Cl.
*F23D 14/36* (2006.01)
*F23K 5/00* (2006.01)
(Continued)

(52) U.S. Cl.
CPC .............. *F23D 14/36* (2013.01); *F23K 5/005* (2013.01); *F23K 5/06* (2013.01); *F23L 1/00* (2013.01)

(58) Field of Classification Search
CPC .. F23D 14/36; F23K 5/005; F23K 5/06; F23L 1/00
(Continued)

(56) References Cited

U.S. PATENT DOCUMENTS 3,738,107 A 6/1973 Miller
3,826,586 A 7/1974 Richards
(Continued)

OTHER PUBLICATIONS

International Search Report for PCT Application Serial No. PCT/IB2021/054954, Aug. 31, 2021, 3 pages.

*Primary Examiner* — Avinash A Savani
(74) *Attorney, Agent, or Firm* — FERENCE & ASSOCIATES LLC (57) ABSTRACT

A burner (1) for producing a flame for a heat generation system, comprising a fuel supply line (3) and at least one a comburent intake system operatively connected to the combustion head (2) for supplying a flow rate of fuel and a flow rate of comburent, respectively, to the burner (1). The burner (1) comprises a turbogas unit having an auxiliary combustion chamber (6) in which combustion takes place and for the generation and conveying, downstream, of a flow of flue gases; and a turbine (7) activated by the flue gases produced by the auxiliary combustion chamber (6). In particular, the turbine (7) is operatively active to contribute at least partially to the movement of the fuel in said comburent supply system (4).

21 Claims, 6 Drawing Sheets

(51) Int. Cl.
*F23K 5/06* (2006.01)
*F23L 1/00* (2006.01)

(58) Field of Classification Search
USPC .......................................................... 431/354
See application file for complete search history.

(56) References Cited

U.S. PATENT DOCUMENTS

| | | | | |
|---|---|---|---|---|
| 4,038,817 | A | 8/1977 | Snow et al. | |
| 2005/0144961 | A1* | 7/2005 | Colibaba-Evulet | C01B 3/36 60/39.01 |
| 2008/0112861 | A1* | 5/2008 | Fisk | B01D 53/869 422/198 |
| 2009/0252659 | A1* | 10/2009 | Iijima | F22B 1/1815 422/173 |
| 2013/0074515 | A1* | 3/2013 | Widener | F02C 9/40 60/39.461 |
| 2021/0132598 | A1* | 5/2021 | Schleif | F23N 5/242 |

* cited by examiner

BURNER WITH GAS TURBINE FOR PRODUCING A FLAME FOR A HEAT GENERATION SYSTEM

The present application is a National Phase Entry of PCT International Application No. PCT/IB2021/054954, filed on Jun. 7, 2021, which claims priority to Italian Application No. 102020000014506 filed on Jun. 17, 2020, the contents of which are hereby incorporated by reference.

FIELD OF APPLICATION

The present invention relates to a burner for producing a flame for a heat generation system, wherein such burner comprises a gas turbine.

In particular, "burner" means an operating machine of a combustion plant in which a fuel and a comburent are mixed and subsequently the combustion reaction initiated by an ignition, generally with the production of a visible flame.

For the present invention, this means that the burner is configured to be applied to a heat generation system (water or vapour boiler, furnace, incinerator, fume afterburner, etc.). In particular, the burner is applied to a combustion chamber in which the generated flame extends.

The present invention is not intended to produce a significant thrust and it is therefore not intended to be applied to the sector of jet propellers for aircraft (excluded sector).

The fuel used may be gaseous (natural gas, LPG, biogas, and generally mixtures containing methane and/or hydrogen), liquid (e.g. diesel, naphtha, ethanol, kerosene), or solid (e.g. wood or pulverised coal).

PRIOR ART

Generally, from a structural point of view, burners can be classified as premix burners, aspirated gas or air burners and forced draught burners.

The former, frequently for civil use (wall-hung boilers, hobs, relatively small generators for producing hot water or steam), comprise a supply conduit having a section narrowing at the point in which the fuel or comburent is introduced. In this way for low powers the air is aspirated naturally by the fuel due to the Venturi effect, generally exploiting the pressure of the mains gas ("atmospheric" or "Bunsen" type burners) or, for higher powers, the fuel is aspirated, with the same principle, by the comburent air moved by a fan activated by an electric motor positioned downstream of the gas valve with Venturi conduit ("premix" burners).

Forced draught burners instead have forced introduction of the air and gas. In this case the air is introduced by means of a fan placed upstream of the combustion head and the gas is introduced by exploiting the mains pressure of the gas itself (in the case of liquid or solid fuels by means of pressurised circuits or pumps).

Such burners are largely used in industrial applications (steam generators, hot air generators, industrial furnaces) and civil applications (hot water boilers for domestic central heating and district heating).

Disadvantageously, forced draught burners need a fan with high prevalence for conveying the air towards the combustion head so as to maintain an effective pressure value for guaranteeing good mixing and suitable flame stability. This aspect implies the use of an electric motor, often with a three-phase power supply, a relatively large size and significant electric consumptions, in particular when it is not provided with energy efficiency devices such as an inverter.

OBJECTS OF THE PRESENT INVENTION

The technical task of the present invention is thus to provide a burner for a combustion system able to overcome the prior-art drawbacks which have emerged.

The object of the present invention is therefore that of creating a burner unconstrained by the use of a fan, with a reduced or null electric power supply requirement.

The technical task and the object specified are substantially attained by a burner comprising the technical features as set out in one or more of the appended claims.

BRIEF DESCRIPTION OF THE FIGURES

Further characteristics and advantages of the present invention will become more apparent from the following approximate, and hence non-limiting, description of a preferred, but not exclusive, embodiment of a burner for a combustion system, as illustrated in the appended drawings, in which.

DESCRIPTION OF ONE OR MORE PREFERRED EMBODIMENTS ACCORDING TO THE PRESENT INVENTION

With reference to the accompanying drawings, the reference number 1 has been used to generally designate a burner, which will be referred to here as burner 1.

In particular, the figures illustrate three embodiments of the present invention (each in two possible variants) which will be described more specifically below. The common characteristics to the three embodiments will be described first generically as follows.

The mentioned figures show a burner 1 comprising a combustion head 2 in which the mixing of a fuel and a comburent takes place and, subsequently, the combustion reaction.

In particular, the burner 1 is a forced draught burner and, therefore, it requires an active flow of comburent on the combustion head 2 for the effective development of the combustion reaction.

The burner 1 comprises a fuel supply line 3 and a comburent supply system operatively connected to the combustion head 2 for supplying, respectively, a flow rate of fuel and a flow rate of comburent to the burner 1 (it can be seen better below that, according to the embodiment, the comburent preferably comprises combustion fumes at the outlet from the turbine plus any secondary air, or it is composed of the forced convection of air that draws the combustion fumes at the outlet from the turbine).

The combustion head 2 is provided to generate a continuous flame at least for the time in which the burner 1 is active and configured to be connected to a combustion chamber of the heat generation system.

The fuel supply line 3 is connected to a source of fuel, for example a delivery conduit of the pressurised fuel.

It is to be noted that the fuel supply source conveys said fuel along the supply line 3 which is then divided into a first branch 3a and a second branch 3b.

In particular, the fuel supply line 3 can supply different types of fuel to the combustion head 2 and to the auxiliary combustion chamber 6, for example gaseous or liquid, preferably natural gas or mixtures of natural gas and hydrogen.

In a variant of the embodiments disclosed and not represented in the appended diagrams the branches 3a and 3b may be independent should two different fuels be used.

Advantageously, the fuel supply line 3 comprises a fuel flow rate adjustment and safety means generically indicated in the figures by reference number 70. The adjustment and safety means 70 is independent for the first branch 3a and for the second branch 3b; for each branch it comprises on-off safety valves 70a which are "normally closed", a stabilised proportional pressure regulator 70b and an electrically actuated regulating valve 70c, 70d.

According to the type of fuel used (e.g. liquid fuel or particular fuels) the safety and adjustment means 70 arranged along the first branch 3a of the fuel supply line 3 and the second branch 3b will be of an appropriately different type.

Furthermore, to guarantee the operation of the turbogas it is preferably necessary to have a relatively high working pressure and therefore a fuel pressure at the burner of the auxiliary combustion chamber 6 that is not negligible; this value may not be reachable without the aid of an intermediate pressure jump. For that purpose it may be necessary to use a small compression booster indicated overall by the number 70e with accumulation, compressor and stabilised proportional pressure regulator. In the appended figures, the compression booster 70e is arranged in the branch 3b upstream of the unit comprising on-off safety valves 70a, regulator and proportional pressure stabiliser 70b and regulating valve 70d, and downstream of the fuel supply source.

As already disclosed, the supply line 3 supplies the fuel to the combustion head of the burner through the branch 3a, whereas the branch 3b supplies the fuel to the burner in the auxiliary combustion chamber 6 of the turbogas unit.

According to the present invention, the burner 1 comprises a compressor 15, an auxiliary combustion chamber 6 and a turbine 7.

The auxiliary combustion chamber 6 is configured to receive a flow rate supplied by the compressor 15 in order to be able to generate at flow of flue gases at high pressure adapted to move the turbine 7. The drive shaft 16 onto which the compressor 15 and turbine 7 are keyed is the same and the unit operates in a Brayton-Joule thermodynamic cycle.

The turbogas unit comprises at least the compressor 15, the auxiliary combustion chamber 6 and the turbine 7 and is appropriately sized as a function of the work requirements and the specific embodiment better described below.

The turbine 7 is configured to generate a total outlet pressure comprised between 0 and 600 millibar (60 kPa) with a mass flow rate less than 70 kg/s.

In the "turbojet" embodiment (FIGS. 1a and 1b) the turbogas unit is appropriately sized to guarantee at the outlet a relatively high enthalpy content of the flue gases, so as to be able to exploit a high flow rate of expanded gases at a high temperature and appropriate pressure.

In the "turboshaft" embodiment (FIGS. 2a and 2b) the turbogas unit is appropriately sized to guarantee at the drive shaft 16 a motor torque suitable to place the impeller in motion and provide sufficient prevalence at the combustion head 2.

In the "turbofan" embodiment (FIGS. 3a and 3b) the turbogas unit is appropriately sized to guarantee at the outlet of the first expansion stage a sufficiently high enthalpy content of the flue gases to be able to exploit the residual energy for the expansion in the second turbine 20, in order to supply a sufficient motor torque to place the impeller in motion and guarantee suitable prevalence at the combustion head 2.

In all the embodiments mentioned above, based on the design characteristics, the turbogas could have multiple expansion 7 compression stages 15. Furthermore, mainly for the "turboshaft" and "turbofan" embodiments, the turbogas unit could be provided with two coaxial drive shafts in the event that it is necessary to comprise two independent turbine-compressor units, for high and low pressure (not shown in the appended figures).

It is also to be noted that any embodiment of the auxiliary chamber 6 can be provided with various burners supplied in parallel, for example, for high powers (an annular auxiliary chamber can be provided with various burners for dispersing and aligning the flame power in the available volume).

The turbine 7 is activated by the high pressure flue gases produced by the auxiliary combustion chamber 6 and directed towards it through the manifold 60.

The auxiliary combustion chamber 6 is connected to the fuel supply line 3 through the branch 3b (defining a bleeding conduit) arranged in derivation from the fuel supply line 3.

In other words, the auxiliary combustion chamber 6 receives as a supply a fraction of fuel flow bled from the fuel supply line 3.

In particular, the fuel flow rate regulation and safety means 70 is further configured to split the flow of fuel to be directed towards the auxiliary combustion chamber 6 through the electro-actuated regulating valve 70d.

The turbine 7 is operatively active to contribute at least partially to the movement of the fuel towards the combustion head 2.

In particular, in the "turbojet" embodiment the jet of flue gases at the outlet from the turbine 7 is directed towards the combustion head 2. In the "turboshaft" and "turbofan" embodiments the fans 9b and 21 push the comburent air towards the combustion head 2 drawing the flue gases ejected from the turbines 7, 20.

In the "turbojet" embodiment the auxiliary comburent air is preferably introduced through the line 4 towards the combustion head 2 by Venturi effect. In the "turboshaft" and "turbofan" embodiments the comburent air, in this case necessary and not auxiliary, is moved thanks to the fans 9b and 21.

In general, the fan 9b or the fan 21 are configured to supply comburent only towards the combustion head 2. In particular, such fans 9b or 21 could be arranged at the head 2 or distanced therefrom but configured to convey the flow towards it (e.g. through an air conveying system).

Figure 3A:
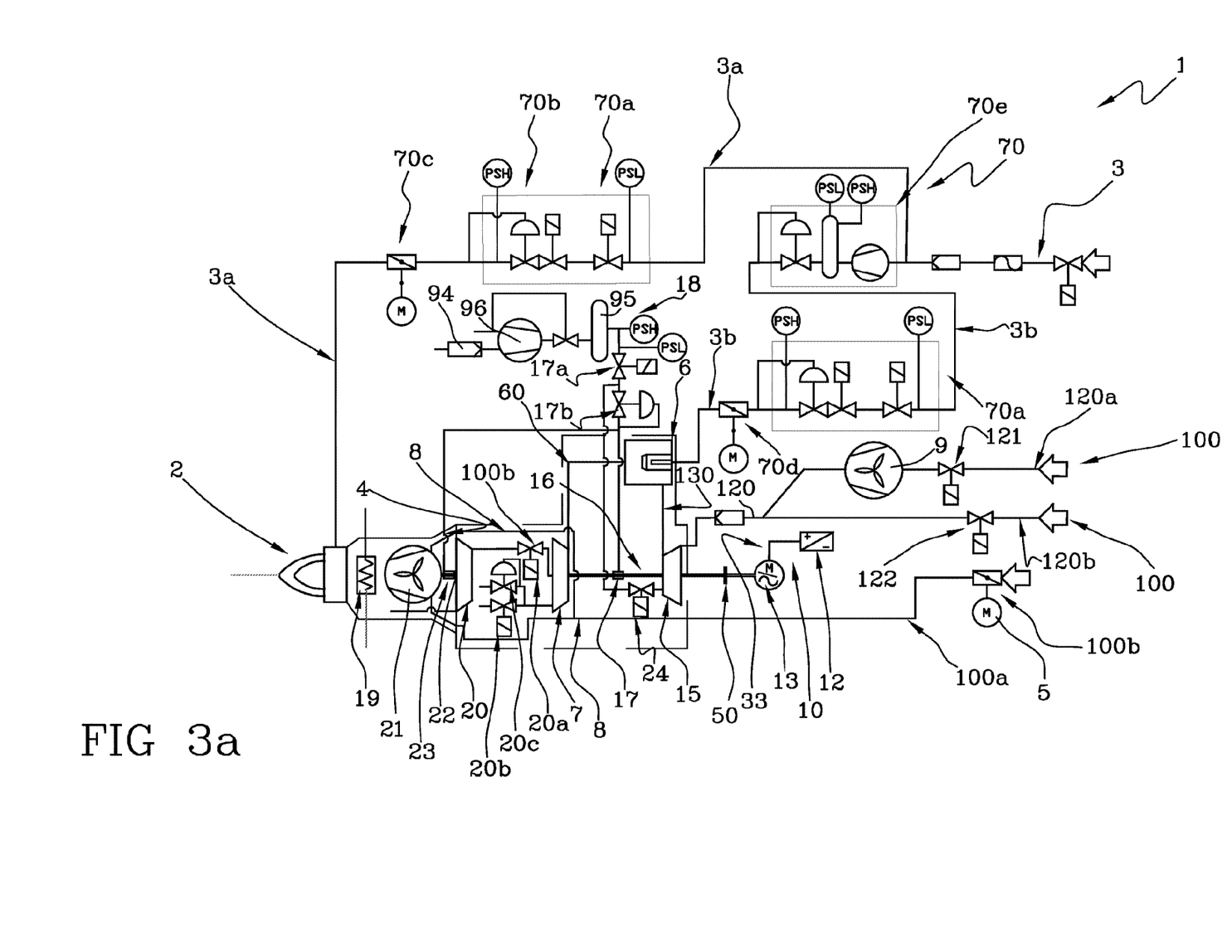
FIG. 3a is a schematic view of a third embodiment (known as a "turbofan") of the burner according to the present invention.
Figure 3B:
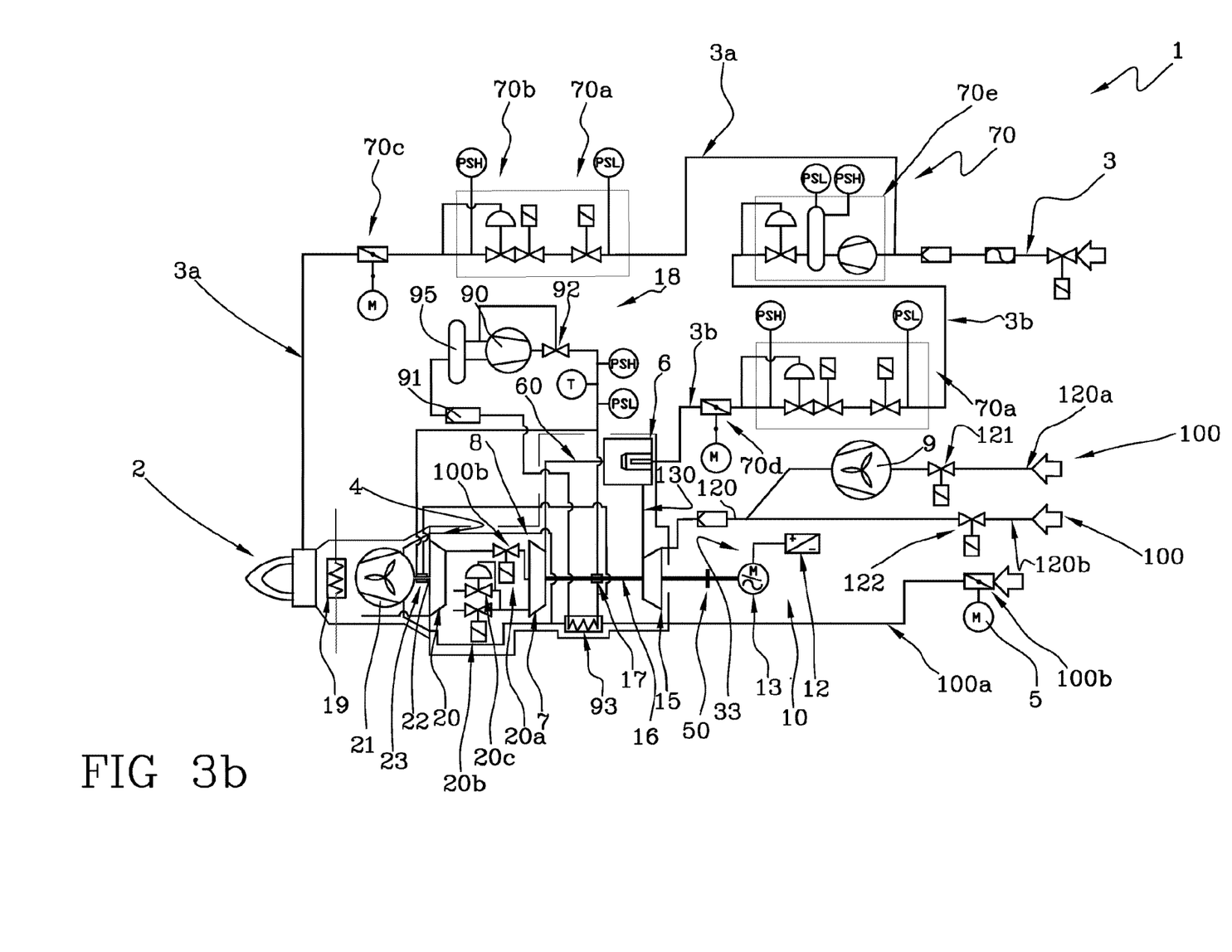
FIG. 3b is a schematic view of a variant of the third embodiment of the burner according to the present invention.

In the embodiment illustrated in FIGS. 3a, 3b ("turbofan") the fan 21 is preferably, but not necessarily, arranged downstream of the turbines 7 and according to a comburent movement direction towards the combustion head 2 so as to supply comburent directly towards the latter.

It is to be noted that the general comburent intake system to the combustion head 2 is created through the line 4 and/or through the part of flue gases at the outlet from the turbine 7. In the "turbojet" embodiment, the intake of comburent can also only be guaranteed by the part of flue gases at the outlet from the turbine 7, without the line 4 being activated or even being present at all in some cases. In fact, for this type of construction, the part of flue gases with relatively high pressure and flow rate and a high residual O2 value (~16%) may be sufficient in itself to guarantee the quantity of comburent necessary for correct combustion. Generally, according to the embodiment, the additional comburent air is aspirated by an ejector system positioned at the exhaust nozzle of the turbine 7 (FIGS. 1*a*-1*b*) whereas the necessary comburent air is forced mechanically by means of a fan (FIGS. 2*a*-2*b* and 3*a*-3*b*).

Any extra ambient air (21% O2) from the line 100*a* can be proportioned thanks to the regulation members 100*b*.

The turbogas unit operates with a possibly high dilution ratio (BPR) preferably from 0.5:1 to 1.5:1 for the turbojet embodiment with aspirated flow and from 2.5:1 to 12:1 for the turboshaft and turbofan embodiments. The turbine 7 and the compressor 5 are preferably made of metal alloys in order to withstand the high motion inertia, mechanical strain and thermal stress that come from the thermodynamic cycle.

According to alternative embodiments, the turbine 7 can comprise portions made of superalloys and/or be made using advanced metalworking techniques such as directional solidification or the creation of single crystal structures in order to guarantee high performance levels in particularly high temperature conditions.

In general, the burner 1 also comprises a fan 9 arranged in a pre- and post-ventilation line 120 of the compressor 4.

Two upstream branches flow into said pre- and post-ventilation line 120, said branches indicated respectively with numbers 120*a* and 120*b* adapted for the entry of air preferably through inlets 100. Said fan 9 or 9*a* is arranged along the branch 120*a*.

It is to be noted that the two branches 120*a* and 120*b* can be alternatively activated through respective valves 121 and 122.

According to the embodiment reported in FIG. 1, the fan 9 can be supplied through an electrical energy source external to the burner, but alternatively it can be powered by a battery connected to the burner itself which is charged during operation as will be better disclosed below.

In particular, the fan 9 can be activated or switched off by a controllable activation means.

Advantageously, based on the type of application and in embodiments that do not have multiple compression stages, the compressor 15 can have a compression ratio comprised between 1.5/1 and 5/1, preferably between 1.5/1 and 3.5/1, and the low compression ratio guarantees a relatively contained rotation regime, for example less than 50000 RPM.

In the embodiment of the diagrams 1, the unit is designed to supply a flow of flue gases which guarantees a characteristic flow rate/pressure curve suitable for supplying the combustion head of the burner, instead of the use of a classic centrifugal fan.

In the other embodiments illustrated and described, the turbogas unit is designed to guarantee a sufficient motor torque to the drive shaft 16 to move a fan that can provide the suitable flow rate and pressure for supplying the combustion head 2 of the burner 1 or a sufficient enthalpy from the first expansion stage to complete the expansion of the gases in a second stage, so as to place in motion a fan that can provide the suitable flow rate and pressure to supply the combustion head 2 of the burner 1.

In particular, the compressor 15 receives a flow of comburent at the inlet through a conduit 120 and supplies the auxiliary combustion chamber 6 through the supply conduit 130. Such flow of comburent is preferably aspirated through the aforesaid inlets 100.

During the starting step of the burner 1 the fan 9 pushes air into the conduit 120 so as to enable the rotation of the unit and generate a flow of comburent towards the auxiliary combustion chamber 6. Following the starting step, the fan 9 may be switched off as the compressor 15 independently promotes the movement of the flow of comburent towards the auxiliary combustion chamber 6. During the switching off step, the fan 9 can be reactivated to cool down the turbogas unit and ventilate air into the combustion chamber of the heat generation system where the burner 1 is installed.

The burner 1 can comprise an electric unit 10 equipped with a battery 12 for powering a plurality of utilities such as for example an electric motor to guarantee the rotation of the unit until the cycle self-support point, alternatively to the starting by means of the fan 9, or the support of the auxiliary line (valve coils, flame control apparatus, servomotors, sensors, etc. . . . ).

Advantageously, the electric unit 10 can further comprise an alternator 13 (which, in some technical variants, can also act as a motor) keyed onto the turbogas shaft for the purpose of being able to charge the battery 12. Furthermore, the electric unit 10 is configured to enable the turbogas unit to be switched on and/or off. On that point, the drive shaft 16 is connected to the alternator 13 by means of a mechanical connection 50 (50*b* in the "turboshaft" embodiment).

Such mechanical connection 50 (or 50*b*) can be configured between a joined condition, in which the drive shaft 16 moves the alternator 13 (e.g. when the turbogas unit is operating at steady speed) and an unjoined condition, in which the alternator 13 is disconnected from the drive shaft 16 (e.g. during a transitory initial activation of the turbogas unit).

Alternatively, a mechanical start of the turbogas unit is possible in which the mechanical connection 50 (or 50*b*) is in the joined condition and the electric motor 13 moves the drive shaft 16 actively until starting has taken place. It is noted that in the figures number 13 is used to identify a single device that acts as an alternator or as a motor according to the operating condition.

As illustrated in the appended figures, the drive shaft 16 onto which the compressor 15 and the turbine 7 are keyed is supported by hydrodynamically supported sliding members 17, with a fluid or gaseous passageway, essentially through oil bushes or bearings or air bearings. In the two specific cases, which define the two embodiments mentioned above for each of the three embodiments, the fluid distribution mechanical configuration varies.

In the event of oil distribution (e.g. FIG. 1*b*), a pump 90 of the circuit is activated at the time in which the starting motor (or fan) is started. Generically, the circuit will be provided with a filter 91, a storage tank 95, a pressure regulator with overflow valve 92, a heat exchanger 93 and monitoring/safety devices for pressure (PSH, PSL) and temperature (T) values. In the event of air distribution (e.g. FIG. 1*a*), the pressure at the bearings 17 may be supplied before starting, e.g. with a timing circuit that opens the on/off valve 17*a* in advance. The flow of air is guaranteed by a storage tank 95 under pressure, according to the layout the storage tank 95 will be "charged" by the compressor 96 as a function of the drop in pressure by a pressure switch (PSL).

Downstream of the storage tank there will be a stabilised pressure regulator 17b for keeping the pressure constant on the bearings 17.

At steady operation, the support of to the bearings can be guaranteed by the same compressor 15 when the pressure, detected through appropriate sensors not shown, reaches the sufficient value to trigger the on/off exchange valves 24 and 17a on the circuit (closure of the valve 17a and opening of the valve 24), so as to bypass the flow of air from the compressor support line 96 to the operating one 15 of the turbogas unit.

The burner 1 can comprise an energy recovery means 33 arranged upstream of the compressor 15 and a heat recovery means 19 arranged downstream of the turbine 7 or of the secondary turbine 20.

Such heat recovery means 19 is configured to recover a part of the thermal energy from the flow of flue gases coming from the turbine 7 or 20. For example, the heat recovery means can comprise a heat exchanger and/or a Seebeck effect energy converter.

In relation to the energy recovery means 33 arranged upstream of the compressor 15, it advantageously comprises the alternator 13 already described which is keyed (through the disconnectable mechanical connection 50) onto the turbogas shaft for the purpose of being able to charge the battery 12 for storing electrical energy and/or for the mains exchange of any surplus.

Figure 1A:
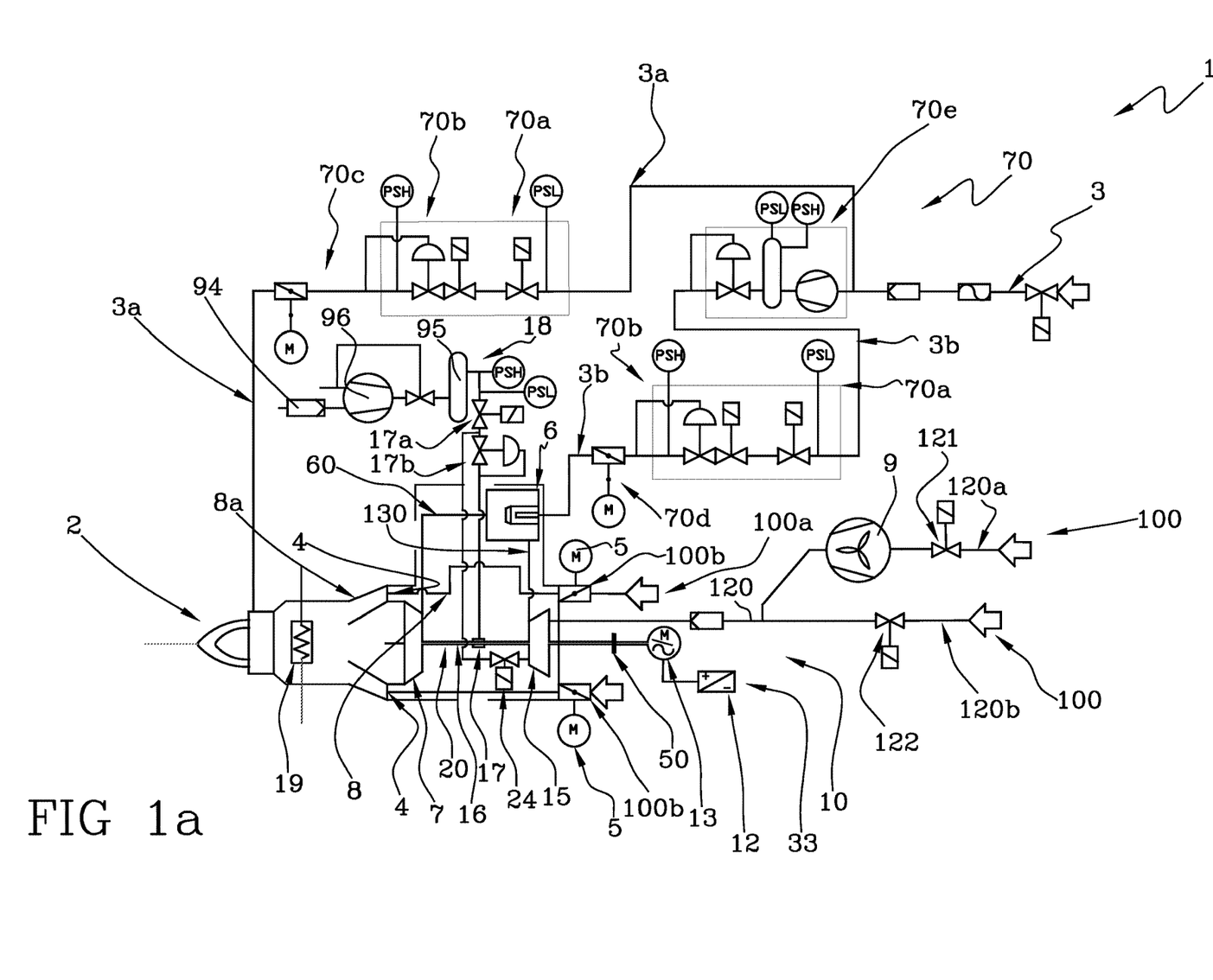
FIG. 1a is a schematic view of a first embodiment (known as a "turbojet") of the burner according to the present invention.
Figure 1B:
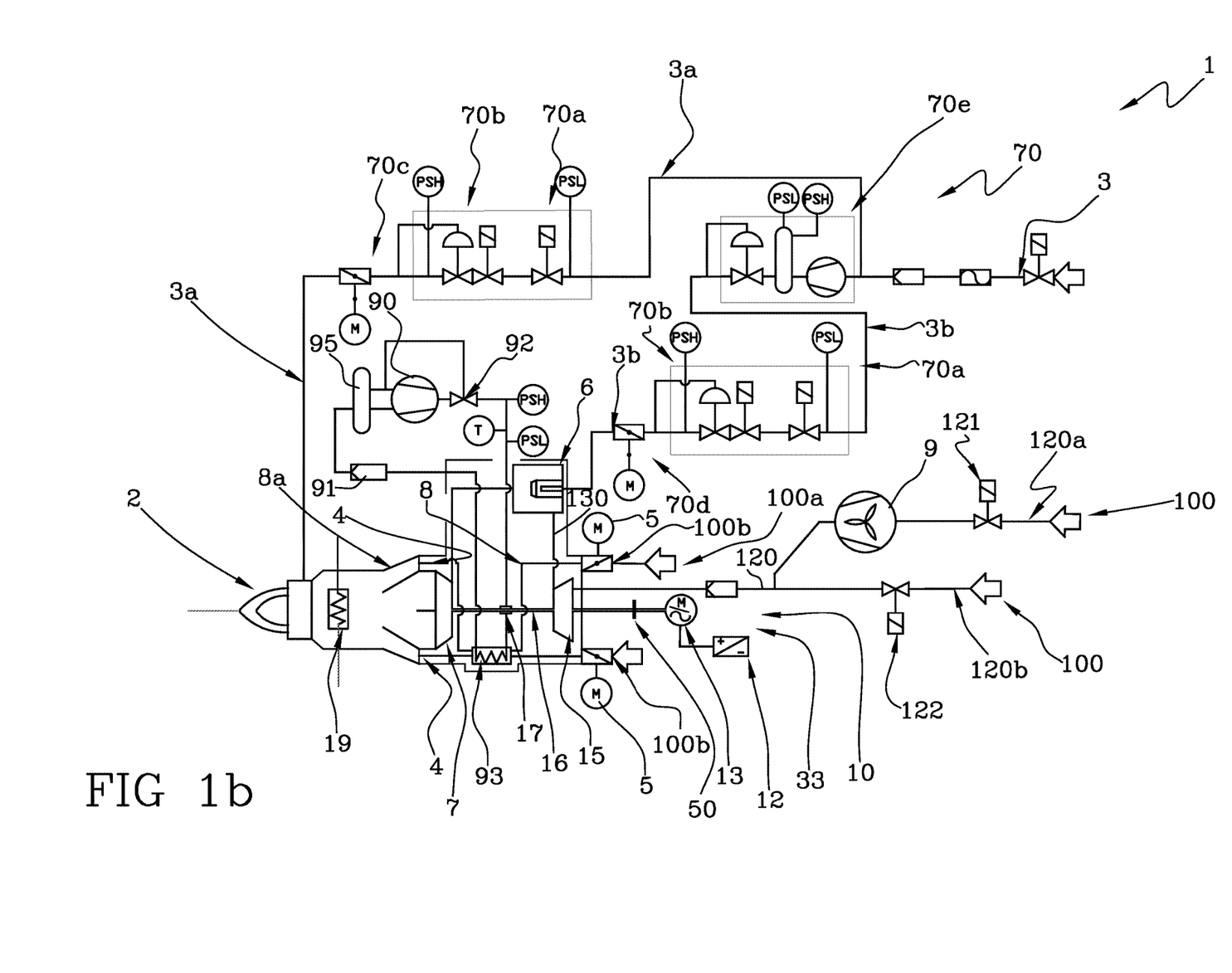
FIG. 1b is a schematic view of a variant of the first embodiment of the burner according to the present invention.
Figure 2A:
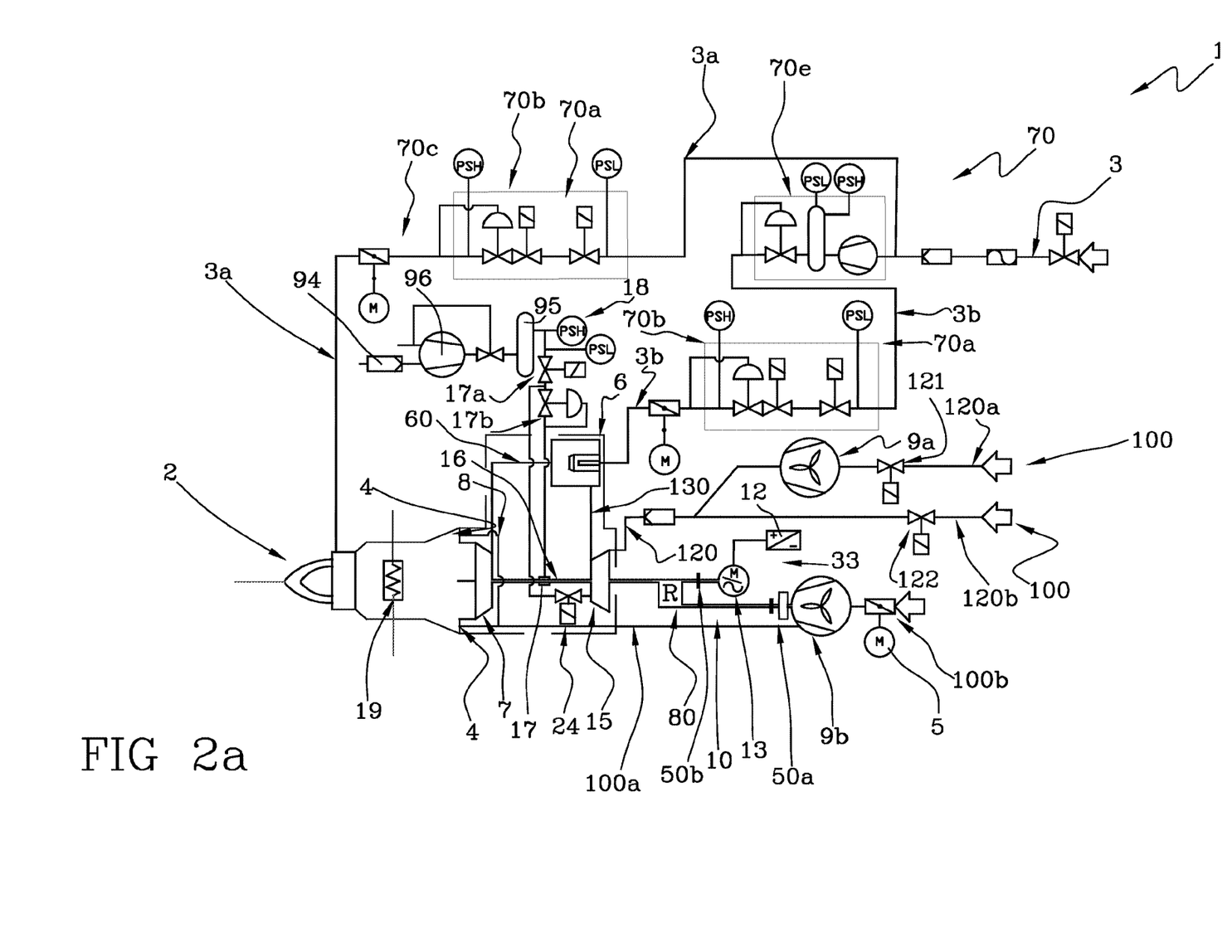
FIG. 2a is a schematic view of a second embodiment (known as a "turboshaft") of the burner according to the present invention.
Figure 2B:
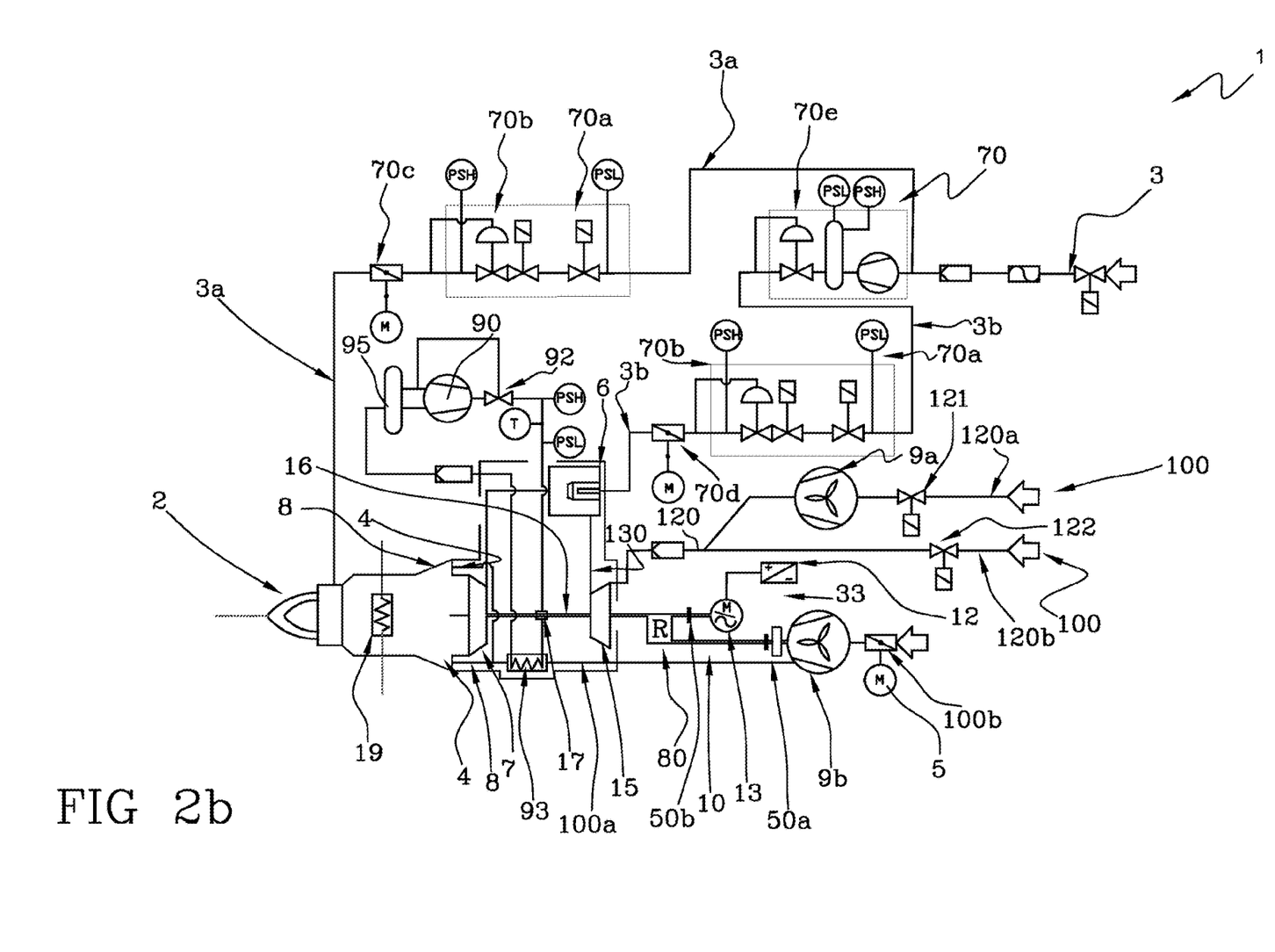
FIG. 2b is a schematic view of a variant of the second embodiment of the burner according to the present invention.

The figures show three different embodiments wherein:
the first embodiment, known as "turbojet", is shown in FIGS. 1a and 1b in the respective variants with air bearings (FIG. 1a) and with oil bushes or bearings (FIG. 1b);
the second embodiment, known as "turboshaft", is shown in FIGS. 2a and 2b in the respective variants with air bearings (FIG. 2a) and with oil bushes or bearings (FIG. 2b);
the third embodiment, known as "turbofan", is shown in FIGS. 3a and 3b in the respective variants with air bearings (FIG. 3a) and with oil bushes or bearings (FIG. 3b);

The first embodiment ("turbojet") shows a burner 1 comprising the combustion head 2 in which the mixing of a fuel and a comburent and, subsequently, the combustion reaction take place.

The turbogas unit is appropriately sized to guarantee at the outlet a flow of flue gases with suitable flow rate and prevalence to supply the combustion head 2 and aspirate an additional comburent air flow by Venturi effect.

The burner 1 comprises the aforesaid fan 9 arranged along the conduit 120 and in particular on the branch 120a. Such fan 9 can be supplied by a source of electrical energy external to the burner, or by means of a battery 12 charged by the alternator 13.

In particular, the fan 9 can be activated or switched off by an activation means.

Furthermore, the compressor 15 receives a flow of comburent at the inlet through the conduit 120 and supplies the auxiliary combustion chamber 6 through the supply conduit 130.

During a starting step of the burner 2 the fan 9 is on and conveys air into the conduit 120 so as to trigger the rotation of the unit and generate a flow of comburent towards the auxiliary combustion chamber 6. Following the starting step, when present, the fan 9 may be switched off as the unit self-supports the cycle and the compressor 15 independently promotes the movement of the flow of comburent towards the auxiliary combustion chamber 6.

Additionally, the burner 1 comprises an electric unit 10 equipped with the battery 12 for powering a plurality of users such as for example an electric motor to guarantee the rotation of the unit until the cycle self-support point, alternatively to the starting by means of the fan 9, and/or the support of the auxiliary line (valve coils, flame control apparatus, servomotors, etc. . . . ).

In other words, the electric unit 10 is configured to enable the turbogas unit to be switched on and/or off.

Advantageously, the electric unit 10 further comprises the alternator 13 (which acts as, or comprises, a starter motor unit) keyed onto the turbogas shaft for the purpose of being able to charge the battery 12.

In particular, the drive shaft 16 is connected to the alternator 13 by means of the mechanical connection 50.

Such mechanical connection 50 can be configured between the joined condition, in which the drive shaft 16 moves the alternator 13 (e.g. when the turbogas unit is operating at full speed) and the unjoined condition, in which the alternator 13 is disconnected from the drive shaft 16 (e.g. during a transitory initial activation of the turbogas unit).

Alternatively, a mechanical start of the turbogas unit is possible in which the mechanical connection 50 is in the joined condition and the motor/alternator 13 moves the drive shaft 16 actively until starting has taken place.

The system is equipped with regulation members 100b for the introduction of secondary comburent air aspirated by the ejector 8a, in FIGS. 1a and 1b, or primary comburent air aspirated by the fan 9b in FIGS. 2a, 2b and by the fan 21 in FIGS. 3a and 3b. In all the variants the secondary or primary flow of comburent air can remove heat by convective motion from the hot components, promoting the thermal performance of the machine.

It is to be noted that the introduction of the secondary comburent air can be performed through a single inlet or through numerous inlets. On that point, for disclosure completeness and only by way of example, the first embodiment shown in FIGS. 1a and 1b has two inlets 100a, whereas the other embodiments shown in the other figures show only one inlet 100a. In any case, it is to be understood that every embodiment of the present invention can indifferently have one or more air inlets 100a.

Furthermore, the drive shaft 16 onto which the compressor and the turbine are keyed is supported by hydrodynamic support sliding members, with a fluid or gaseous passageway, essentially through oil bushes or bearings or air bearings. In the two specified cases the mechanical configuration of the distribution of fluids varies.

In the event of oil distribution (FIG. 1b), the pump 90 of the circuit is activated at the time in which the starting motor (or fan) is started.

Generically, the circuit is provided with a filter 91, a storage tank 95, a pressure regulator 92 with overflow valve, a heat exchanger 93 and monitoring/safety devices for pressure (PSH, PSL) and temperature (T) values. In the event of air distribution (FIG. 1a), the pressure at the bearings 17 may be supplied before starting, e.g. with a timing circuit that opens the on/off valve 17a in advance. The flow of air is guaranteed by a storage tank 95 under pressure; according to the layout the storage tank 95 will be "charged" by the compressor 96 as a function of the drop in pressure by a pressure switch (PSL). Downstream of the storage tank 95 there will be a stabilised pressure regulator 17b for keeping the pressure constant on the bearings 17. The air support to the bearings 17 is guaranteed by the same compressor 15 when the pressure reaches the sufficient value to trigger the on/off exchange valves 24 and 17a (closure of the valve 17*a* and opening of the valve 24) of the circuit, so as to bypass the flow of air from the compressor support line 96 to the operating one of the turbogas unit.

The burner 2 comprises an energy recovery means 33 arranged upstream of the compressor and a heat recovery means 19 arranged downstream of the turbine 7.

Such heat recovery means 19 is configured to recover a part of the thermal energy from the flow of flue gases coming from the turbine 7 or 20. For example, the heat recovery means can comprise the heat exchanger and/or a Seebeck effect energy converter.

The energy recovery means 33 comprises for example the above-mentioned alternator 13 and the energy storage battery 12.

The embodiment of FIG. 2 ("turboshaft") shows a burner 1 comprising the combustion head 2 in which the mixing of a fuel and a comburent takes place and, subsequently, the combustion reaction.

The turbogas unit is appropriately sized to guarantee sufficient torque to the drive shaft 16 to be able to move the fan 9*b* so as to provide sufficient prevalence to the comburent flow for the correct mixing in the combustion head 2; for that purpose, the compressor 15 and possibly the turbine 7 could be multi-stage or the turbogas unit could be composed of two independent turbine-compressor units, for high and low pressure.

In such embodiment, as well as the fan 9*a* present also in the other embodiments, there is a further fan 9*b* which can be activated in rotation by the turbine 7.

The fan 9*a* is arranged along the branch 120*a* and can be activated by means of the supply of an electrical energy source external to the burner 1 and/or the electric unit 10 which comprises the alternator/motor 13 and the battery 12.

In other words, the burner 1 comprises the electric unit 10 equipped with an electric motor for the activation of the turbogas unit as an alternative to the fan 9*a*; such fan may in any case be used in a pre- or post-ventilation step. The fan 9*b* is preferably configured to supply comburent only towards the combustion head 2. In particular, such fan 9*b* could be arranged at the head 2 or distanced therefrom but configured to convey the flow towards it (e.g. through an air conveying system).

Furthermore, the fan 9*b* is connected to the turbogas unit by means of a mechanical connection 50*a*.

Such mechanical connection 50*a* can be configured between two conditions: an unjoined condition in which, for example, during an ignition step of the burner 1 the fan 9*b* is disconnected from the drive shaft of the demultipler 80 and a joined condition in which, for example, during a fully operational step of the turbogas unit the fan 9*b* is connected to the drive shaft of the demultipler 80 to promote a direct flow of comburent towards the combustion head 2 and passing through the path 8.

In particular, to enable the triggering of the rotation of the fan in the most gradual way possible and prevent kickback on the drive shaft 10 and upstream on the turbogas unit the mechanical connection 50*a* may comprise a viscous coupling (Ferguson type) as well as a synchronous mechanical coupling.

In particular, the demultipler 80 enables a rotation of the fan 9*b* with a lower angular speed with respect to that of the turbogas drive shaft 16.

As for the previous embodiment, the electric unit 10 is equipped with a battery 12 for storing the current supplied by the alternator and for supplying the electric motor 13.

In fact, advantageously, the electric unit 10 comprises the alternator 13 connected to the turbogas unit for storing at least a part of the mechanical energy of the turbine 7 in the battery 12.

In this way, the electric unit 10 enables the generation of electrical energy guaranteeing power supply to a plurality of users.

Furthermore, the burner 1 comprises an activation means to enable the switching on and/or off of the fan 9*a*.

The burner 1 comprises the compressor 15 adapted to supply a flow of comburent at the inlet to the auxiliary combustion chamber 6.

Also in this case, the drive shaft 16 is connected to the alternator 13 by means of a mechanical connection 50*b*.

Such mechanical connection 50*b* can be configured between a joined condition, in which the drive shaft 16 moves the alternator 13 (e.g. when the turbogas unit is operating at full speed) and an unjoined condition, in which the alternator 13 is disconnected from the drive shaft 16 (e.g. during a transitory initial activation of the turbogas unit).

In this way, during the transitory initial activation of the turbogas unit, the mechanical connection 50*a* is in an unjoined condition so that the fan 9*a* provides the necessary air for the start and the fan 9*b* does not create any further inertia for the starting the unit. Then, when the turbogas unit is at sufficient speed, the mechanical connection 50*a* can be in a joined condition so that the turbogas unit moves the fan 9*b* for the introduction of comburent air towards the combustion head 2.

Alternatively, a mechanical start of the turbogas unit is possible in which the mechanical connection 50*b* is in the joined condition and the electric motor 13 moves the drive shaft 16 actively until starting has taken place; in this condition the connection 50*a* can be unjoined for the reasons disclosed 10 above.

In particular, the compressor 15 receives a flow of comburent at the inlet through a conduit 120 to then supply the auxiliary combustion chamber 6 through the supply conduit 130.

In detail, the turbine 7 and the compressor 15 are keyed onto a drive shaft 16 supported by means of gas bearings 17 supplied by means of an auxiliary power supply line 18 and/or by means of a junction bled from the compressor 15.

Alternatively, oil bearings or bushes can be provided without the inventive concept underpinning the present invention being altered.

In the event of oil distribution (FIG. 2*b*), the pump 90 of the circuit is activated at the time in which the starting motor (or fan) is started. Generically, the circuit will be provided with a filter, a storage tank 95, a pressure regulator with overflow valve 92, a heat exchanger 93 and monitoring/safety devices for pressure and temperature (T) values. In the event of air distribution (FIG. 2*a*), the pressure to the bearings may be supplied before starting, e.g. with a timing circuit that opens the on/off valve 17*a* in advance. The flow of air is guaranteed by a storage tank 95 under pressure; according to the layout the storage tank will be "recharged" by the compressor 96 as a function of the drop in pressure detected by a pressure switch (PSL); downstream of the storage tank there will be a stabilised pressure regulator 17*b* for keeping the pressure constant on the bearings 17. The air support to the bearings may be guaranteed by the same compressor 15 when the pressure reaches a sufficient value to trigger the on/off exchange valves 24 and 17*a* (closure of the valve 17*a* and opening of the valve 24) of the circuit, so as to bypass the flow of air from the compressor support line to the operating one of the turbogas unit.

FIG. 3 ("turbofan") shows the burner 1 comprising the combustion head 2 in which the mixing of a fuel and a comburent takes place and, subsequently, the combustion reaction.

The turbogas unit is appropriately sized to provide the second expansion stage with sufficient motor torque so as to guarantee, through the fan 21, sufficient prevalence at the combustion head 2. For that purpose, the compressor 15 and possibly the turbine 7 could be multi-stage or the turbogas unit could be composed of two independent turbine-compressor units, for high and low pressure.

For the purpose of providing the correct excess of air at the combustion head 2 in the embodiment of the double expansion stage turbofan burner there is a path 8 for the supply of comburent air which is introduced by means of one or more regulation members 100b, also electrically actuated. If the turbogas shaft is not started directly by electrical means, the line 120 can act for triggering the unit by providing the necessary quantity of air for the compressor 15 through a fan 9 with appropriate on-off exchange valves 121, 122. In this case the fan can have the second function of ventilating with a pre-ventilation step and cooling the unit with a post-ventilation step.

The burner 1 comprises the compressor 15, a combustion chamber 6, a turbine 7 and a second turbine 20.

Such secondary turbine 20 is arranged so as to receive exhaust gases produced by the turbine 7. Preferably, as illustrated in the appended figures, the secondary turbine 20 is arranged downstream of the turbine 7 according to a movement direction of comburent towards the combustion head 2.

The combustion chamber 6 is configured to receive a flow rate of air processed by the compressor 15 in order to be able to generate a flow of gas at high pressure adapted to move the turbine 7, then the gases with high enthalpy leaving from the first expansion stage flow and expand in the second stage, which moves the fan 21. The rotation shaft onto which the compressor and turbine are keyed is the same and the unit operates in a Brayton-Joule double expansion cycle. The connection shaft 22 of the fan 21 and turbine 20 of the second stage is unconstrained and independent from the first. The turbogas unit is appropriately sized to guarantee a sufficient output pressure from the first stage to be able to move the turbine 20 activating the fan 21 so as to be able to provide enough prevalence to the comburent flow for the correct mixing in the combustion head 2.

The turbine 20 is moved by the exhaust gases, with high residual enthalpy, deriving from the first expansion stage and provides for the mechanical movement of a fan 21 by means of a drive shaft 22.

It is to be noted that such fan 21 is preferably arranged upstream of the turbogas unit despite the figure representing, for schematic simplicity purposes, such fan 21 arranged downstream of the turbine 20.

The first expansion unit supplies the exhaust gas to the second one by means of a manifold in which an on/off valve 20a is interposed, which is activated alternatively with an ejection valve 20b of the gases of the first stage which opens when the second one is not in use; in this way the high pressure unit can be triggered at continuous cycle even when/if the combustion head 2 remains off.

Any overpressure of the first expansion stage, when the valve 20b is closed, can be evacuated by a self-opening valve 20c as a function of exceeding a certain set pressure threshold.

In other words, the turbine 7 is activated by the high pressure flue gases produced by the auxiliary combustion chamber 6 and directed towards the turbine 7 through the manifold 60.

The integration air introduced by the line 100a has at the same time an effect of removing heat by convection from the turbogas unit through an ideal path 8 that licks the hot elements; in this way, it is possible to reduce heat dispersion and bring about an improvement in the overall operating energy balance of the machine.

The fuel flow rate regulation means 70 is further configured to split the flow of fuel to be directed towards the auxiliary combustion chamber 6.

The turbine 7 is operatively active for substantially contributing to the discharge of gases at high pressure in the second stage which moves the fan 21.

The gases leaving from the turbine 20, and possibly from the valve 20c, are drawn towards the combustion head 2 by the air supplied by the fan.

Also for this embodiment, the drive shaft 16 is connected to the alternator 13 by means of the mechanical connection 50.

Such mechanical connection 50 can be configured between a joined condition, in which the drive shaft 16 moves the alternator 13 (e.g. when the turbogas unit is operating at full speed) and an unjoined condition, in which the alternator 13 is disconnected from the drive shaft 16 (e.g. during a transitory initial activation of the turbogas unit).

Furthermore, the drive shaft 16 onto which the compressor and the turbine are keyed is supported by hydrodynamic support sliding members, with fluid or gaseous passageway, essentially through oil bushes or bearings or air bearings. In the two specified cases the mechanical configuration of the distribution of fluids varies.

In the event of oil distribution (FIG. 3b), the pump 90 of the circuit is activated at the time in which the starting motor (or fan) is started. Generically, the circuit will be provided with a filter 91, a storage tank 95, a pressure regulator 92 with overflow valve, a heat exchanger 93 and monitoring/safety devices for pressure and temperature (T) values.

In the event of air distribution, the pressure at the bearings 17 may be supplied before starting, e.g. with a timing circuit that opens the on/off valve 17a in advance. The flow of air is guaranteed by a storage tank 95 under pressure; according to the layout the storage tank will be "recharged" by the compressor 96 as a function of the drop in pressure by a pressure switch (PSL); downstream of the storage tank there will be a stabilised pressure regulator 17b for keeping the pressure constant on the bearings 17. The air support to the bearings 17 and to the bearings 23 may be guaranteed by the same compressor 15 when the pressure reaches a sufficient value to trigger the on/off exchange valves 17a and 24 of the circuit, so as to bypass the flow of air from the compressor support line 96 to the operating one of the turbogas unit.

The burner 2 can comprise an energy recovery means 33 arranged upstream of the compressor 13 and a heat recovery means 19 arranged downstream of the turbine 7.

Such recovery means 19 is configured to recover a part of the thermal energy from the flow of flue gases coming from the turbine 7.

For example, the heat recovery means can comprise a heat exchanger and/or a Seebeck effect energy converter.

The present invention further relates to a heat generation system comprising a combustion chamber (preferably defined by a water or steam boiler and/or a furnace, and/or an incinerator, and/or a fume afterburner) and a burner of the type described above in which the combustion head 2 is connected to the combustion chamber so that the flame generated extends into said combustion chamber.

According to a further aspect the present invention relates to a method for supplying a burner comprising the step of bleeding at least a first quantity of a fuel from a fuel supply line and supplying at least a second quantity of fuel to a combustion head.

In other words, the method envisages bleeding a part of fuel from the fuel supply line adapted to supply the burner.

The method further comprises the step of burning the first quantity of fuel.

Such step is performed inside a combustion chamber. The method further envisages the step of converting part of the energy coming from the combustion of the bled fuel for supplying comburent to the combustion head.

Preferably, the method comprises the step of activating the turbine by means of flue gases in the aforementioned combustion chamber.

In particular, the turbine can be connected to a fan, or to a second turbine connected to a fan, adapted to promote a flow of fluid, preferably air, to the combustion head of the burner.

It is therefore observed that the present invention reaches the proposed aims by providing a burner able to operate in conditions of reduced or null electrical power supply and with the possibility to generate current for supplying the operating devices and for introducing any surplus into the line. The current invention reaches the set objects by finding a compact solution with respect to the prior art and providing a single machine that obtains the multiple aim prefixed by the aforesaid applications.

In particular, the turbogas unit gives the outgoing fumes the necessary prevalence to be able to guarantee the operation of the combustion head. The flow of comburent for the combustion head 2 can also be modulated thanks to a gas regulation valve which can vary the flow rate of fuel of the burner in the auxiliary combustion chamber 6 of the turbogas unit, increasing or reducing the rotation speed thereof. It is also possible to regulate the necessary or secondary quantity of comburent air thanks to the electrically actuated regulation systems.

Advantageously, the post-combustion performed on the exhaust gases coming from the turbines 7, or 20 contributes to reducing the content of NOx emissions.

Advantageously, the flow of comburent air that licks the surfaces of the hot members improves the thermal balance increasing the performance of the machine.

Advantageously, the possibility of being able to regulate the flow of gases to the turbogas boiler, together with the possibility of manoeuvring the regulation devices of the aspirated fuel, increases the modulation ratio of the burner 2 with respect to the use of a traditional centrifugal ventilator without an inverter used in a common burner.

Advantageously, the system may be configured to produce heat through a recuperator downstream of the turbogas unit.

Advantageously, the possibility of being able to generate electrical current, recover heat and obtain a flame for a process configures the unit as a tri-generation unit and reaches the aim of optimising the process and follows the trend of increased efficiency and decreased pollutants which are required by current legislation.

Advantageously, the present invention can be used with fuels comprising hydrogen or hydrogenated mixtures such as hydromethane.

Advantageously, the present invention can be equipped with an electronic regulation system and the flows of fuel and comburent can be detected by relevant flow rate measurement sensors so as to automate and make combustion more efficient.

The invention claimed is:

1. A heat generation system, comprising:
   a combustion chamber;
   a burner for producing a flame for a heat generation system comprising:
   a combustion head provided to generate a continuous flame at least when the burner is active and configured to be connected to a combustion chamber of the heat generation system;
   a fuel supply line and a comburent intake system operatively connected to said combustion head for supplying a flow rate of fuel and a flow rate of comburent, respectively, to said burner;
   an auxiliary combustion chamber of a gas turbine separate from said combustion head and configured for the combustion of a fuel and for the generation of a flow of flue gases; and
   a turbine activated by the flue gases produced by the auxiliary combustion chamber, and in that said turbine is operatively active for contributing at least partially to the movement of the comburent in said comburent intake system, wherein said turbine directs an output of a jet of exhaust gas towards said combustion head produced by said turbine;
   wherein said combustion head is inserted at least in part inside said combustion chamber so that the flame generated extends into said combustion chamber; said combustion chamber being defined by at least one of: a water boiler, vapour boiler, a furnace, and an incinerator.

2. The heat generation system according to claim 1, characterized in that said turbine is configured to generate a total outlet pressure comprised between 0 and 600 millibar with a mad flow rate less than 70 kgs/s.

3. The heat generation system according to claim 1, wherein said auxiliary combustion chamber is connected to said fuel supply line, in particular by means of a bleeding conduit arranged as a derivation branch from said fuel supply line.

4. The heat generation system according to claim 1, wherein said jet of exhaust gas causing the suction of the comburent, in particular by means of the Venturi effect, from a comburent supply line part of said comburent intake system.

5. The heat generation system according to claim 1, comprising a fan configured to contribute to supplying comburent to said comburent intake system and activatable in rotation by said turbine.

6. The heat generation system according to claim 5, characterized in that said fan is mounted on the drive shaft onto which the turbine is keyed.

7. The heat generation system according to claim 5, characterized in that said fan is configured to supply comburent only towards the combustion head.

8. The heat generation system according to claim 6, wherein the fan is connected to said drive shaft by means of a mechanical connection which can be configured between an unjoined condition in which the fan is disconnected from the drive shaft and a joined condition in which the fan is connected to the drive shaft for promoting a flow of comburent directed towards the combustion head.

9. The heat generation system according to claim 6, wherein said fan is arranged downstream of the turbine according to a movement direction of the comburent towards the combustion head so as to supply comburent towards the latter.

10. The heat generation system according to claim 1, comprising a secondary turbine defining a second expansion stage arranged so as to receive exhaust gases produced by the turbine, said second turbine arranged downstream of said turbine according to a movement direction of the comburent towards the combustion head in order to supply comburent towards the latter.

11. The heat generation system according to claim 1, comprising an additional fan activated in rotation by means of a machinal connection between said fan and said secondary turbine.

12. The heat generation system according to claim 1, further comprising a compressor with one or more compression stages configured to supply a flow rate of comburent entering said auxiliary combustion chamber; said compressor and said turbine being keyed onto the drive shaft for defining a turbogas unit associated with said auxiliary combustion chamber.

13. The heat generation system according to claim 12, comprising an electric activation connected to said drive shaft for activating said turbogas unit at least in a starting step of the burner.

14. The heat generation system according to claim 12, comprising a fan connected by means of an air intake conduit to said compressor for activating said turbogas unit at least in a starting step of the burner and for ventilating in the pre-starting step or for colling the unit in a switching off step.

15. The heat generation system according to claim 14, characterized in that said air intake conduit of the turbogas unit has at least two inlets provided with valves for opening or closing alternatively said at least two inlets, which can preferably be adjusted for adjusting or splitting the flow rate of comburent entering said air intake conduit.

16. The heat generation system according to claim 1, comprising an electric unit equipped with an electric motor for activating the turbogas unit during an initial starting step; said electric unit preferably being equipped with a battery for the electric power supply of said electric motor.

17. The heat generation system according to claim 16, wherein said electric unit further comprises an alternator connected to said drive shaft for storing at least a part of mechanical energy of the turbine during an operating step.

18. The heat generation system according to claim 1, comprising an energy recovery means in turn comprising a thermal recovery means arranged downstream of the turbine and configured to recover thermal energy from said flow of the flue gases coming from said turbine.

19. The heat generation system according to claim 1, wherein said turbine is mounted on a drive shaft supported by gas or air bearings, said bearings preferably being connected to an auxiliary gas or air supply line.

20. A method for producing a flame for a heat generation system according to claim 1, comprising the steps of:
bleeding at least a first quantity of a fuel from a fuel supply line intended for the supply of the fuel to the combustion head provided to generate said flame and connectible to the combustion chamber of the heat generation system;
burning said first quantity of fuel in the auxiliary combustion chamber from the combustion head; and
converting part of the energy coming from the combustion of the bled fuel into mechanical energy for supplying the comburent to said combustion head.

21. The method according to claim 20, comprising the following steps:
arranging a turbine for converting said part of energy coming from the combustion of the bled fuel configured for contributing at least partially to the movement of the comburent in said combustion head;
configuring said turbine in order to generate a total outlet pressure comprised between 0 and 600 millibar with a mass flow rate less than 70 kg/s.

* * * * *